United States Patent [19]

Shiga et al.

[11] Patent Number: 5,680,154
[45] Date of Patent: Oct. 21, 1997

[54] OPERATION INPUTTING APPARATUS

[75] Inventors: Sadakazu Shiga; Masaru Komatsu; Minoru Numata, all of Iwaki, Japan

[73] Assignee: Alps Electric Co., Ltd., Tokyo, Japan

[21] Appl. No.: 449,039

[22] Filed: May 24, 1995

[30] Foreign Application Priority Data

May 25, 1994 [JP] Japan ................... 6-111290
May 25, 1994 [JP] Japan ................... 6-111292

[51] Int. Cl.$^6$ ................................... G09G 5/08
[52] U.S. Cl. ................. 345/145; 345/161; 345/157
[58] Field of Search ............................ 345/156, 157, 345/158, 159, 160, 161, 168, 145

[56] References Cited

U.S. PATENT DOCUMENTS

| | | |
|---|---|---|
| 4,680,577 | 7/1987 | Straayer et al. |
| 4,983,786 | 1/1991 | Stevens et al. ............ 345/159 |
| 5,231,380 | 7/1993 | Logan ...................... 345/156 |
| 5,252,971 | 10/1993 | Franz et al. .............. 345/168 |
| 5,269,004 | 12/1993 | Comerford et al. ........ 345/168 |
| 5,287,121 | 2/1994 | Louis et al. .............. 345/156 |
| 5,349,370 | 9/1994 | Katayama et al. ......... 345/159 |
| 5,432,530 | 7/1995 | Arita et al. .............. 345/159 |
| 5,446,480 | 8/1995 | Yoshida ................... 345/157 |
| 5,469,191 | 11/1995 | Smith, III et al. ........ 345/159 |
| 5,473,347 | 12/1995 | Collas et al. ............. 345/168 |
| 5,489,900 | 2/1996 | Cali et al. ............... 345/168 |
| 5,499,041 | 3/1996 | Brandenburg et al. ...... 345/168 |
| 5,508,719 | 4/1996 | Gervais ................... 345/168 |
| 5,515,040 | 5/1996 | Lee et al. ................ 345/368 |
| 5,521,596 | 5/1996 | Selker et al. ............. 345/161 |
| 5,541,622 | 7/1996 | Engle et al. .............. 345/161 |
| 5,550,562 | 8/1996 | Aoki et al. ............... 345/161 |

*Primary Examiner*—Richard Hjerpe
*Assistant Examiner*—Kent Chang
*Attorney, Agent, or Firm*—Guy W. Shoup; Patrick T. Bever

[57] ABSTRACT

An operation inputting apparatus is disclosed by which, even if a load detection output remains after an operation of a stick type operation member is stopped by an operator, a load detection output which coincides with stopping of the operation of the stick type operation member can be obtained. A pressure detection sensor detects a load force applied to the stick type operation member upon operation of the stick type operation member, and a comparison circuit compares a load detection value obtained from the pressure detection sensor with a preset load value. A timer circuit adjusts a count value in response to a result of the comparison and detects the count value equal to zero to produce a zero detection output. A judgment level production section sets two judgment levels for presence or absence of an output in response to the zero detection output. The judgment levels are set such that the judgment level for presence or absence of an output when the zero detection output is supplied is higher than the judgment level for presence or absence of an output when the zero detection output is not supplied.

3 Claims, 11 Drawing Sheets

OPERATION INPUTTING APPARATUS

BACKGROUND OF THE INVENTION

1. Field of the Invention

This invention relates to an operation inputting apparatus which includes a stick type operation member, and more particularly to an operation inputting apparatus such as a computer keyboard apparatus which eliminates any possible disadvantage encountered when a stick type operation member is operated with an excessively high operating force as well as an operation inputting apparatus which minimizes a dispersion in detection output value of a detection sensor used for a stick type pressure sensor and a detection error arising from an influence of an environmental circumstance, a disturbance or the like.

2. Description of the Related Art

Conventionally, various keyboard apparatus are known including a keyboard apparatus of the type which only includes several operation keys arranged in a predetermined order on an operation section and another keyboard apparatus of the type which includes such operation keys and a stick type operation member (stick pointer) located at a predetermined location among the operation keys.

A stick type operation member (stick pointer) for use with a keyboard apparatus includes a total of four strain gauges each on each of the opposite sides of a root portion thereof in a transverse direction (X-axis direction) and a depthwise direction (Y-axis direction). The paired strain gauges in each of the transverse and depthwise directions are connected in series across a dc power source, and detection outputs in the transverse direction and the depthwise direction are extracted from connection points of the paired strain gauges. Then, if an operator pushes, with a fingertip thereof, at an end of the stick type operation member to move in a desired direction, then a lead force applied upon such movement acts upon the strain gauges in the two different directions so that the resistance values of the strain gauges are varied. Consequently, if the variations of the resistance values are detected as voltage variations in the individual directions and the detection outputs are read, then operation data representative of the lead force to the end of the stick type operation member can be obtained. Then, the operation data representative of the lead force are digitized and processed suitably in the keyboard apparatus and then transmitted to a main unit such as a personal computer to which the keyboard apparatus is connected.

In the meantime, in the main unit, when the operation data representative of the load force are supplied to a display section, they act to move a cursor in the display section- In this instance, the direction of movement of the cursor is determined in accordance with the direction of the load (pressing) force applied to the stick type operation member while the speed of movement of the cursor is determined in accordance with the magnitude of the load (pressing) force applied to the stick type operation member.

In the known keyboard apparatus of the type which includes a stick type operation member (stick pointer), if a key operator pushes (operates) the end of the stick type operation member to move in a desired direction, then the load (pressing) force applied upon such movement (operation) acts upon the strain gauges in the different directions so that the resistance values of the strain gauges are varied, and the variations of the resistance values are detected as voltage variations. If the key operator removes the load (pressing) force applied to the end of the stick type operation member, then the resistance values of the strain gauges must restore to their original values exhibited prior to their variations and also the detection outputs extracted from the connection points between the paired strain gauges must restore their original values exhibited prior to the variations.

With an actual stick type operation member (stick pointer), however, since inertia of the stick type operation member itself and/or a residual component of a displacement arising from adhesion of a bonding agent or the like are present, even if the load (pressing) force applied to move the stick type operation member by pushing operation of the same is removed, the stick type operation member will not immediately restore its original condition exhibited prior to such movement but will restore its original condition exhibited prior to the movement after lapse of a short time. Also the detection outputs extracted from the connection points between the paired strain gauges do not immediately restore their original conditions, exhibited prior to the variations, but the variation residual component gradually attenuates until it decreases finally to zero. Particularly if a high load (pressing) force is applied when the stick type operation member is pushed (operated) to move the displacement residual component is produced notably.

FIGS. 7(a) and 7(b) illustrate a relationship between the operation condition of the stick type operation member (stick pointer) and the load detection output obtained by the operation, and in particular, FIG. 7(a) illustrates the operation condition while FIG. 7(b) shows the actual load detection output.

In FIGS. 7(a) and 7(b), the axis of ordinate indicates the load level and the axis of abscissa indicates time.

When the stick type operation member is operated for a fixed period of time, if a load (pressing) force higher than a certain level is applied to operate the stick type operation member as seen in FIG. 7(a), then even if the thus applied load (pressing) force is removed after lapse of the fixed period of time, the load detection output does not immediately restore its original level exhibited prior to the variation, but returns to its original level after a process of displacement which decreases gradually.

Meanwhile, in the known keyboard apparatus of the type which includes a stick type operation member, when the cursor on the display section of the main unit is moved by a pushing operation of the stick type operation member, since the speed of movement of the cursor increases linearly in proportion to the load (pressing) force applied upon the operation of the stick type operation member, if a key operator wants to take a great amount of movement of the cursor, then if the key operator tries to achieve the movement of the cursor in a comparatively short time, then a high load (pressing) force must be applied continuously to the stick type operation member. Besides, when such movement of the cursor by a great amount is performed successively, the movement of the cursor becomes considerably slow, resulting in a problem that the operator may be irritated very much.

Further, there is a different problem in that, when the end of the stick type operation member is pushed to move, since the variation in resistance value caused by the pressing force applied to each pressure detection sensor (strain gauge) is very small, where the dispersion in initial resistance value among the paired pressure detection sensors (strain gauges) provided for each of the two perpendicular directions is great, fine variations of the resistance values obtained by the pressure detection sensors (strain gauzes) cannot be read accurately.

Further, in the known keyboard apparatus having a stick type operation member, when fine detection outputs obtained from the paired pressure detection sensors (strain gauges) provided for the two different directions are amplified, a level variation is produced in the fine detection outputs by a variation of the power source voltage, a variation in ambient temperature, application of external noise or the like. Consequently, there is a further problem in that a fine variation in resistance value of each of the pressure detection sensors (strain gauges) cannot be read accurately.

SUMMARY OF THE INVENTION

It is an object of the present invention to provide an operation inputting apparatus by which, even if a load detection output exists after completion of an operation of a stick type operation member, a load detection output which coincides with stopping of the operation of the stick type operation member can be obtained.

It is another object of the present invention to provide an operation inputting apparatus wherein the speed of movement of a cursor is varied in accordance with an amount of movement of the cursor to achieve movement of the cursor in a comparatively short time to moderate an irritated feeling of a key operator.

It is a further object of the present invention to provide an operation inputting apparatus wherein fine variations of detection output values of pressure detection sensors can be read accurately without being influenced by a dispersion in initial resistance value among the pressure detection sensors.

It is a still further object of the present invention to provide an operation inputting apparatus wherein fine variations of detection output values of pressure detection sensors can be read accurately without being influenced by a power source voltage, an ambient temperature, external noise and so forth.

In order to attain the objects described above, according to an aspect of the present invention, there is provided an operation inputting apparatus, wherein it comprises a stick type operation member, a pressure detection sensor for detecting a load force applied to the stick type operation member upon operation of the stick type operation member, comparison means for comparing a load detection value obtained from the pressure detection sensor with a preset load value, time setting means for adjusting a count value in response to a result of the comparison of the comparison means, zero time detection means for detecting that the count value of the time setting means becomes equal to zero and generating a zero detection output, and output judgment level setting means for setting two judgment levels for presence or absence of an output in response to the zero detection output, and the judgment levels for presence or absence of an output of the output judgment level setting means are set such that the judgment level for presence or absence of an output when the zero detection output is supplied is higher than the judgment level for presence or absence of an output when the zero detection output is not supplied.

In the operation inputting apparatus, the comparison means compares a load detection value obtained from the pressure detection sensor upon operation of the stick type operation section with a preset value (certain load value), and the time setting means performs counting up of a counter when the load detection value is higher than the preset value, but performs counting down of the counter when the load detection value is equal to or lower than the preset value. The zero time detection means detects that the count value of the counter of the time setting means becomes equal to zero and produces a zero detection output. The output judgment level setting means sets two judgment levels for presence or absence of an output in response to the zero detection output. Then, the judgment levels for presence or absence of an output of the output judgment level setting means are set such that the judgment level for presence or absence of an output when the zero detection output is supplied is higher than the judgment level for presence or absence of an output when the zero detection output is not supplied.

Thus, with the operation inputting apparatus, when the stick type operation member is operated, if a load force higher than the fixed value is successively applied, then a high level is selected as the judgment level for presence or absence of an output. Consequently, detection of presence of an output is performed with the high level so that a residual detection output when the load force is removed may not substantially be outputted. On the other hand, when the stick type operation member is operated, if a load force equal to or lower than the fixed value is applied or if no load is applied (no operation is performed), then a low level is selected as the judgment level for presence or absence of an output. Consequently, detection of presence of an output is performed with the low level. Since the judgment level for presence or absence of an output is determined in response to a detection output corresponding to the load force, even if a residual detection output remains after the operation of the stick type operation member, it is possible to obtain accurate operation output information of the stick type operation member.

According to another aspect of the present invention, there is provided an operation inputting apparatus, wherein it comprises a stick type operation member, a pressure detection sensor for detecting a load force applied to the stick type operation member upon operation of the stick type operation member, and cursor movement speed setting means for receiving the load force detected by the pressure detection sensor and setting a speed of movement of a cursor to be displayed on a display section of a main unit in accordance with a magnitude of the load force, and the cursor movement speed setting means controls the speed of movement of the cursor so as to vary linearly with respect to a variation of the load force until the load force detected by the pressure detection sensor reaches a fixed value but controls the speed of movement of the cursor so as to suddenly increase in a curve with respect to a variation of the load force after the load force exceeds the fixed value.

In the operation inputting apparatus, the cursor movement speed setting means controls the speed of movement of the cursor so as to increase linearly in proportion to a variation of the load force for a time until the load force detected by the pressure detection sensor upon operation of the stick type operation member varies from a low value to an intermediate certain value, but after the load force increases exceeding the certain value, the cursor movement speed setting means controls the speed of movement of the cursor so as to suddenly increase in a curve by a rate higher than that in the linear proportional increase with respect to a variation of the load force.

Accordingly, with the operation inputting apparatus, if the load force applied upon operation of the stick type operation member increases, then since the speed of movement of the cursor increases suddenly in response to the magnitude of the load force thus applied, not only when a key operator selects a large amount of movement of the cursor, but also when the key operator successively selects a large amount of movement of the cursor, the speed of movement of the cursor can be made considerably higher than the prior speed of movement of the cursor. Consequently, the irritated feeling of the key operator can be moderated and a very good operation feeling can be obtained.

According to a further aspect of the present invention, there is provided an operation inputting apparatus, wherein it comprises a stick type operation member, a pressure detection sensor for detecting pressing forces to the stick type operation member in a transverse direction and a depthwise direction, detection outputting means for outputting an initial detection value based on an initial correction value and a detection output of the pressure detection sensor at least in one of the transverse direction and the depthwise direction, and comparison control means for judging whether or not the initial detection value is within a predetermined reference range and outputting, when it is judged that the reference range is exceeded, a correction value for a next operation cycle of a polarity and a magnitude conforming to a direction and a magnitude of the excess, respectively, and the detection output and the correction value for a next operation cycle are inputted to the detection outputting means so that the detection value obtained at the output of the detection outputting means may fall within the reference range.

In the operation inputting apparatus, the detection outputting means first outputs an initial detection value based on an initial correction value and a detection output of the pressure detection sensor, and then the comparison control means judges whether or not the initial detection value outputted from the detection outputting means is within the predetermined reference range and outputs, only when it is judged that the reference range is exceeded, a correction value for a next operation cycle of a polarity and a magnitude conforming to a direction and a magnitude of the excess, respectively. Then, when the correction value for a next operation cycle is outputted, the detection outputting means operates based on the detection output from the pressure detection sensor and the correction value for a next control cycle inputted thereto to output a detection value for a next operation cycle which is offset so as to fall within the reference range.

In this manner, with the operation inputting apparatus, even if the initial resistance values of the pressure detection sensors in pair have a dispersion and consequently the detection outputs from the pressure detection sensors have an offset between them, the offset is automatically corrected. Consequently, fine variations in resistance value of the pressure detection sensors corresponding to a condition of movement of the stick type operation member are always read accurately, and accordingly, the amount of movement of the stick type operation member can be detected accurately.

According to a still further aspect of the present invention, there is provided an operation inputting apparatus, wherein it comprises a stick type operation member, a pressure detection sensor for detecting pressing forces to the stick type operation member in a transverse direction and a depthwise direction, detection outputting means for generating a detection output value from the pressure detection sensor at least in one of the transverse direction and the depthwise direction, reference value setting means for setting an offset reference value, an allowable offset range centered at the offset reference value and an output reference value, output judgment means for judging whether or not a difference between the detection output value of the pressure detection sensor and the offset reference value remains within the allowable offset value, and reference value setting changing means for changing, when the output judgment means judges after lapse of a predetermined time that the difference between the detection output value of the pressure detection sensor and the offset reference value still remains within the allowable offset range, the offset reference value and the output reference value set by the reference value setting means in response to the detection output value of the pressure detection sensor.

In the operation inputting apparatus, the detection outputting means produces a detection output value from the pressure detection sensor, and the reference value setting means sets an offset reference value, an allowable offset range centered at the offset reference value and an output reference value. The output judgment means judges whether or not a difference between the detection output value of the pressure detection sensor and the offset reference value remains within the allowable offset value. Then, when the output judgment means judges after lapse of the predetermined time that the difference between the detection output value of the pressure detection sensor and the offset reference value still remains within the allowable offset range, the reference value setting changing means operates to change the offset reference value and the output reference value set by the reference value setting means in response to the detection output value of the pressure detection sensor.

With the operation inputting apparatus, even if the detection output value of the pressure detection sensor exhibits a variation with respect to time by an influence of a variation in power source voltage or ambient temperature or exhibits a temporary variation by an influence of external noise or the like, fine variations in resistance value of the pressure detection sensors corresponding to a condition of movement of the stick type operation member are always read accurately without being influence of the variation mentioned above, and accordingly, the amount of movement of the stick type operation member can be detected accurately.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 8 is a flow chart illustrating operations of principal components of the operation inputting apparatus of FIG. 4 when the stick type operation member is operated:

FIG. 8 is a block diagram of a further operation inputting apparatus showing a third embodiment of the present invention:

FIG. 11 is a flow chart illustrating a process of compensation operation of the operation inputting apparatus of FIG. 10 when, during operation of the operation inputting apparatus, digital data varies beyond an allowable offset range due to a power source variation, an ambient temperature variation, superposition of noise or the like.

DETAILED DESCRIPTION OF THE PREFERRED EMBODIMENTS

Figure 1:
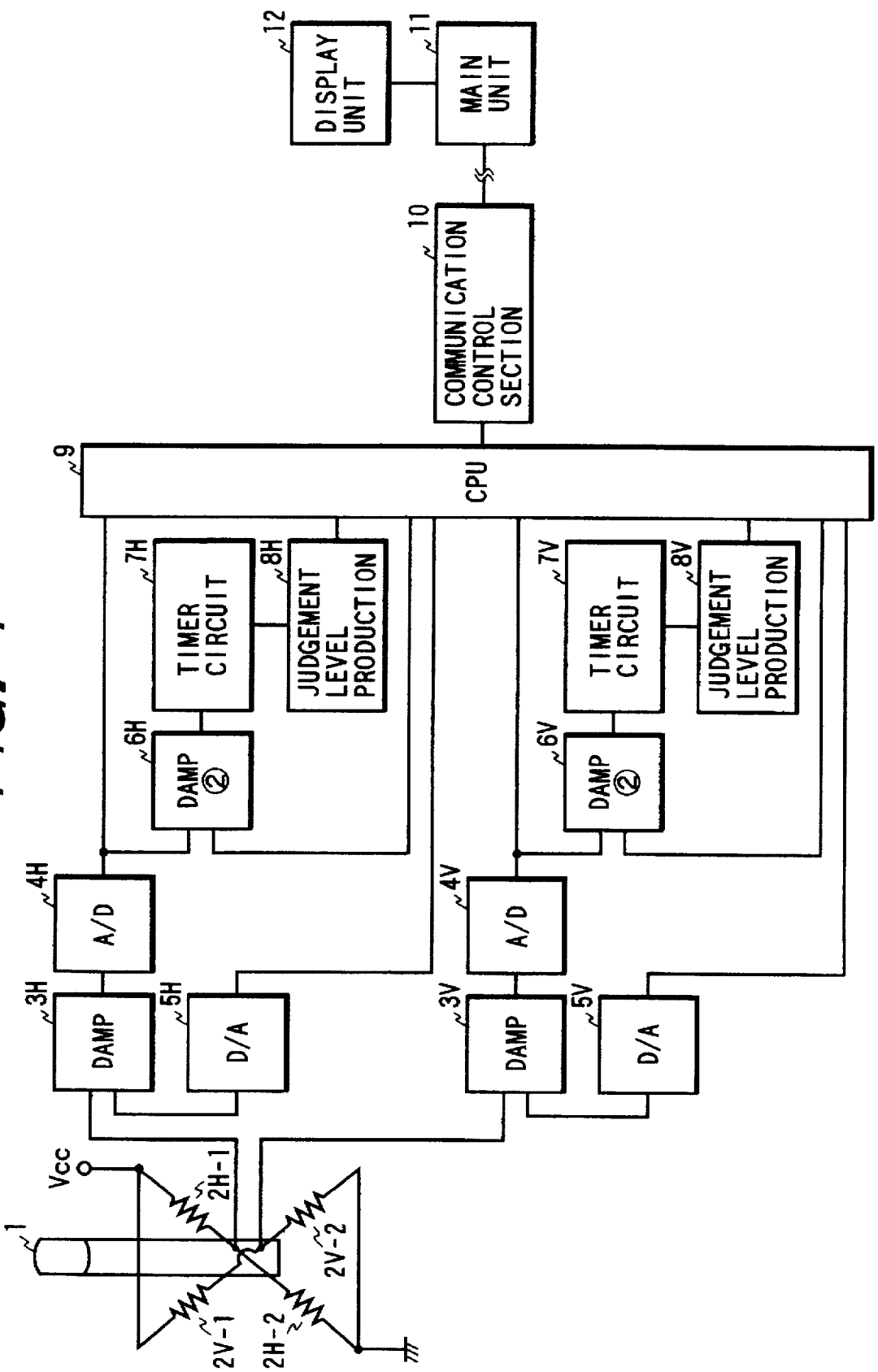
FIG. 1 is a block diagram of an operation inputting apparatus showing a first embodiment of the present invention.

Referring first to FIG. 1, there is shown an operation inputting apparatus according to a first (and presently preferred) embodiment of the present invention. The operation inputting apparatus of the first embodiment is constructed as a keyboard apparatus which includes a stick type operation member.

The stick type operation member 1 has a pair of transverse direction side strain gauges (pressure detection sensors) 2H-1 and 2H-2 adhered to the opposite sides of a root portion (connection point) thereof in a lateral or transverse direction (X-axis direction), and another pair of depthwise direction side strain gauges (pressure detection sensors) 2V-1 and 2V-2 adhered to the opposite sides of the root portion (connection point) thereof in a perpendicular depthwise direction (Y-axis direction). The paired transverse direction side strain gauzes 2H-1 and 2H-2 are connected in series between a power source terminal Vcc and a grounding point, and also the paired depthwise direction side strain gauges 2V-1 and 2V-2 are connected in series between the power source terminal Vcc and another grounding point. In this instance, if an end of the stick type operation member 1, which is connected to the root portions and extends perpendicular to the X-axis and Y-axis directions (i.e., in a 2-axis direction), is pushed to move by a fingertip of a key operator, then the resistance values of the transverse direction side strain gauzes 2H-1 and 2H-2 are varied relative to each other in response to a magnitude and a polarity of a transverse direction component of the pushing force, and similarly, also the resistance values of the depthwise direction side strain gauzes 2V-1 and 2V-2 are varied relative to each other in response to a magnitude and a polarity of a depthwise direction component of the pushing force. A transverse direction side differential amplifier (DAMP) 3H is coupled at one of a pair of inputs thereof to a connection point between the paired transverse direction side strain gauges 2H-1 and 2H-2 and at the other input thereof to an output of a transverse direction side digital to analog converter (D/A) 5H. Also a depthwise direction side differential amplifier (DAMP) 3V is coupled at one of a pair of inputs thereof to a connection point between the paired depthwise direction side strain gauges 2V-1 and 2V-2 and at the other input thereof to an output of a depthwise direction side digital to analog converter (D/A) 5V. A transverse direction side analog to digital converter (A/D) 4H is coupled at an input thereof to an output of the transverse direction side differential amplifier 3H, and also a depthwise direction side analog to digital converter (A/D) 4V is coupled at an input thereof to an output of the depthwise direction side differential amplifier 3V. The transverse direction side digital to analog converter 3H is coupled at an input thereof to a central control unit (CPU) 9 and at an output thereof to the other input of the transverse direction side differential amplifier 3H. Also the depthwise direction side digital to analog converter 5V is connected at an input thereof to the central control unit 9 and at an output thereof to the other input of the depthwise direction side differential amplifier 3V.

Meanwhile, a second transverse direction side differential amplifier (comparison means) (DAMP ②) 6H is coupled at one of a pair of inputs thereof to an output of the transverse direction side analog to digital converter 4H and at the other input thereof to the central control unit 9. Also a second depthwise direction differential amplifier (comparison means) (DAMP ②) 6V is coupled at one of a pair of inputs thereof to an output of the depthwise direction side analog to digital converter 4V and at the other input thereof to the central control unit 9. A transverse direction side timer circuit section (time setting means and zero time detection means) 7H is connected at an input thereof to an output of the second transverse direction side differential amplifier 6H, and also a depthwise direction side timer circuit section (time setting means and zero time detection means) 7V is coupled at an input thereof to an output of the second depthwise direction differential amplifier 6V. A transverse direction side output presence/absence judgment level production section (output judgment level setting means) 8H is coupled at an input thereof to an output of the transverse direction side timer circuit section 7H and at an output thereof to the central control unit 9. Also a depthwise direction side output presence/absence judgment level production section (output judgment level setting means) 8V is coupled at an input thereof to an output of the depthwise direction side timer circuit section 7V and at an output thereof to the central control unit 9. Further, a communication control section 10 is connected at an input thereof to the central control unit 9 and at an output thereof to an input of a main unit 11 which may be a personal computer, and a display unit 12 such as a display apparatus is coupled to the main unit 11.

Figure 2A:
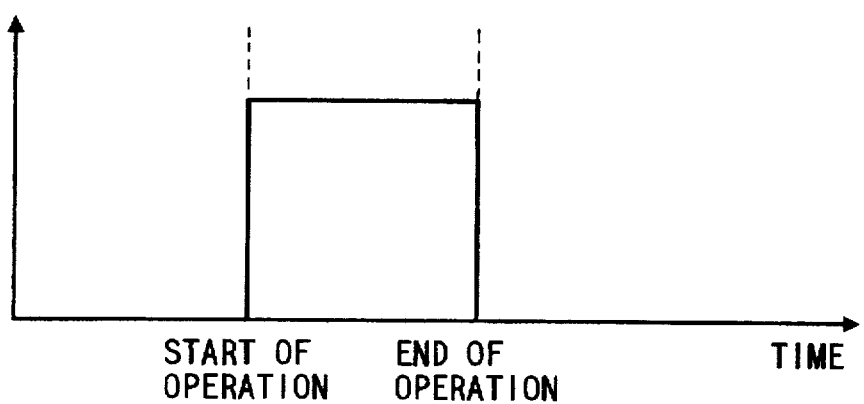
FIGS. 2(a) and 2(b) are characteristic diagrams illustrating an operation condition of a stick type operation member of the operation inputting apparatus of FIG. 1 and a load detection output from a strain gauge of the operation inputting apparatus and a load output presence/absence judgment condition, respectively.
Figure 2B:
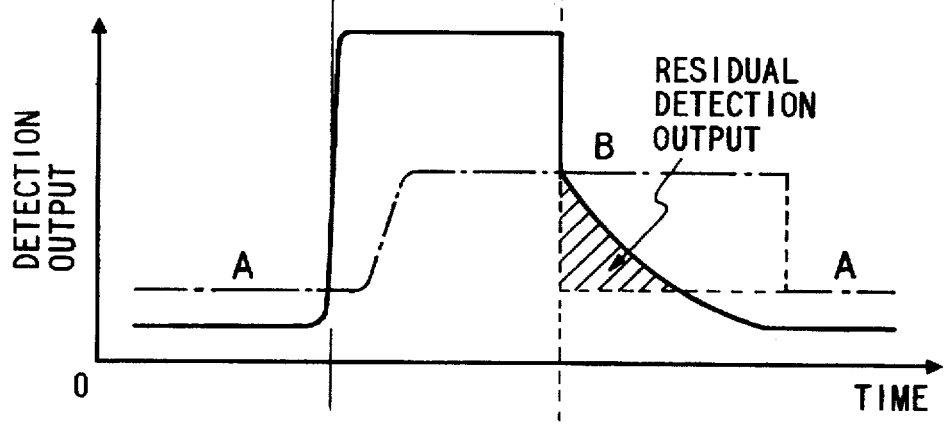

FIGS. 2(a) and 2(b) illustrate a relationship of an operation condition of the stick type operation member 1 to a load detection output from a strain gauge and a load output presence/absence judgment condition. In particular, FIG. 2(a) illustrates an operation condition of the stick type operation member 1, and FIG. 2(b) illustrates a load detection output and a judgment level of presence or absence of a load output.

Here, operation of the keyboard apparatus of the first embodiment will be described with reference to FIGS. 2(a) and 2(b). It is to be noted, however, that, since operations performed by the components 2H-1, 2H-2 and 3H to 8H for the transverse direction side are substantially same as operations performed by the components 2V-1, 2V-2 and 3V to 8V for the depthwise direction side, in the following description, only the operations performed by the components 2H-1, 2H-2 and 3H to 8H for the transverse direction side will be described while description of the operations performed by the components 2V-1, 2V-2 and 3V to 8V for the depthwise direction side are omitted herein.

Now, if a key operator operates the stick type operation member 1 as seen in FIG. 2(a), then the resistance values of the transverse direction side strain gauges 2H-1 and 2H-2 are varied relative to each other in accordance with the direction of the operation and the magnitude of the load force upon the operation. In response to the variations of the resistance values, a dc voltage which represents the load force upon the operation of the stick type operation member 1 is produced at the connection point between the transverse direction side strain gauges 2H-1 and 2H-2. The dc voltage is supplied to the transverse direction side differential amplifier 3H. The transverse direction side differential amplifier 3H differentially amplifies the dc voltage and a correction value supplied thereto from the transverse direction side digital to analog converter 5H to produce an output voltage corresponding to a difference between them. The transverse direction side analog to digital converter 4H digitizes the output voltage of the transverse direction side differential amplifier 3H and supplies it as digital data representative of the load detection output to the central control unit 9 and the second transverse direction side differential amplifier 6H as seen in FIG. 2(b).

Then, the second transverse direction side differential amplifier 6H compares the digital data with a preset value (preset load value) supplied thereto from the central control unit 9. In this instance, the preset load value is selected so as to correspond to digital data with which the load force to be applied to the transverse direction side strain gauges 2H-1 and 2H-2 upon operation of the stick type operation member 1 may be a certain value, for example, 200 g. If the second transverse direction side differential amplifier 6H judges as a result of the comparison that the digital data is higher than the preset load value, then it outputs a comparison output and supplies the comparison output to the transverse direction side timer circuit section 7H. The transverse direction side timer circuit section 7H includes a counter, which successively counts up while the comparison output is continuously supplied thereto from the second transverse direction side differential amplifier 6H, but if the supply of the comparison output stops, then the counter thereafter counts down successively. Further, if the count value of the counter becomes equal to zero, the transverse direction side timer circuit section 7H produces and supplies a zero detection output to the transverse direction side output presence/absence judgment level production section 8H. The transverse direction side output presence/absence judgment level production section 8H selectively produces an output presence/absence judgment level of a low level A or an output presence/absence judgment level of a high level B as seen in FIG. 2(b) and supplies it to the central control unit 9. In this instance, the transverse direction side output presence/absence judgment level production section 8H produces the low level A as an output presence/absence judgment level when a zero detection output is supplied thereto from the transverse direction side timer circuit section 7H and within a period of time after supply of a zero detection output from the transverse direction side timer circuit section 7H is stopped until after a predetermined time elapses. However, the transverse direction side output presence/absence judgment level production section 8H produces the high level B as an output presence/absence judgment level after the predetermined time elapses after supply of a zero detection output from the transverse direction side timer circuit section 7H is stopped.

Meanwhile, the central control unit 9 compares the digital data supplied thereto from the transverse direction side timer circuit section 7H with the low level A or the high level B supplied thereto from the transverse direction side output presence/absence judgment level production section 8H, and outputs information of presence of an output, for example, a logic value 1, when the digital data is higher than the low level A or the high level B. However, when the digital data is equal to or lower than the low level A or the high level B, the central control unit 9 outputs information of absence of an output, for example, a logic value 0. The logic value 1 or 0 outputted from the central control unit 9 is supplied to the communication control section 10 at the next stage. The communication control section 10 transmits the information of the logic level 1 or 0 inputted thereto from the keyboard apparatus to the main unit 11 such as a personal computer connected externally to the keyboard apparatus. When the information of the logic value 1 or 0 is received, the main unit 11 supplies the information to the display unit 12 so that the cursor displayed on the display unit 12 is moved suitably in a horizontal direction in accordance with the contents of the information.

Figure 3:
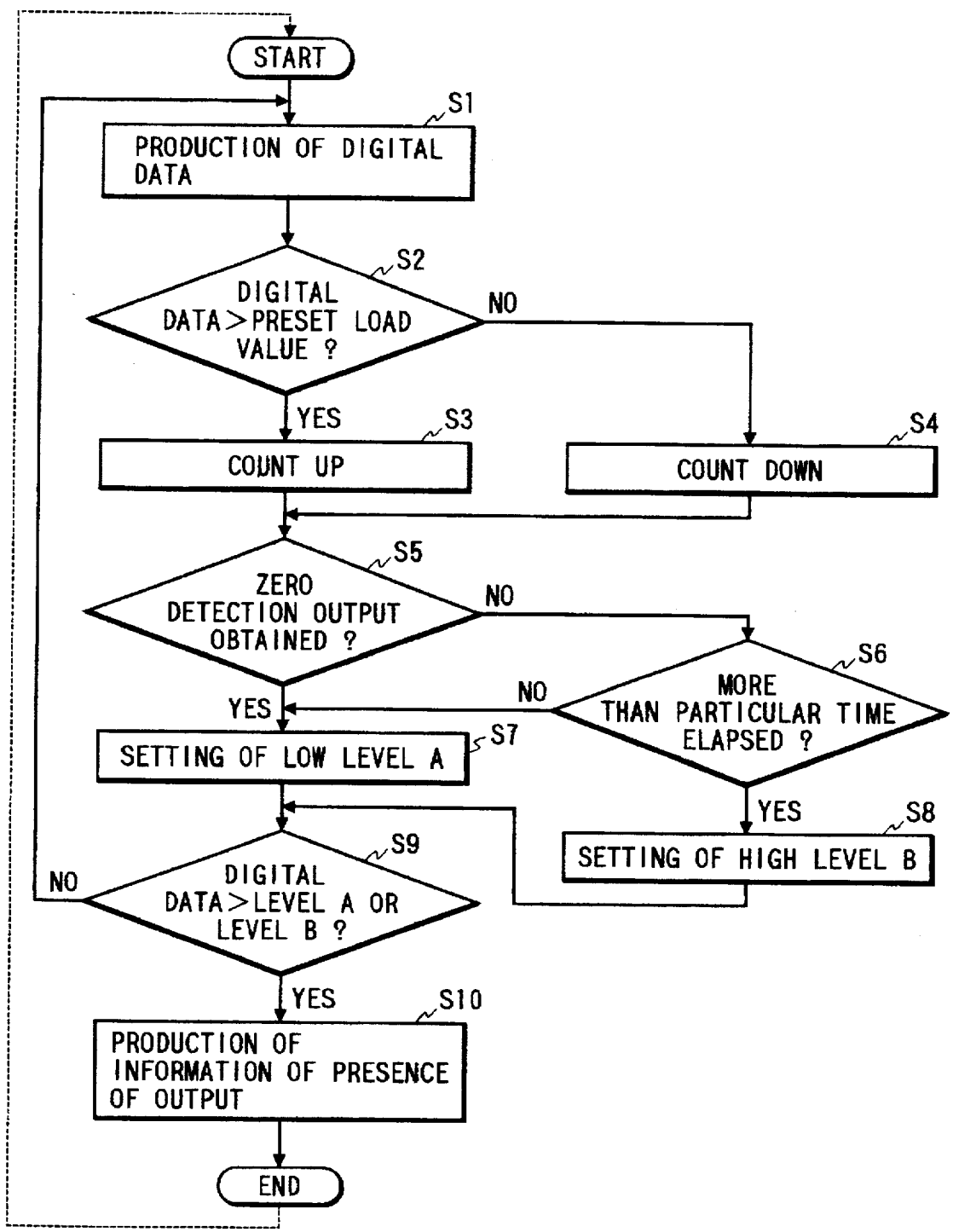

FIG. 3 illustrates operation conditions of the main components of the keyboard apparatus of FIG. 1 when the stick type operation member 1 is operated.

Also in the following description given below with reference to the flow chart of FIG. 3, since operations performed by the components 2H-1, 2H-2 and 3H to 8H for the transverse direction side are substantially same as operations performed by the components 2V-1, 2V-2 and 3V to 8V for the depthwise direction side, only the operations performed by the components 2H-1, 2H-2 and 3H to 8H for the transverse direction side will be descried below while description of the operations performed by the components 2V-1, 2V-2 and 3V to 8V for the depthwise direction side is omitted herein.

First at step S1, the transverse direction side analog to digital converter 4H produces digital data originating from an operation of the stick type operation member 1 and supplies the digital data to the second transverse direction side differential amplifier 6H and the central control unit 9.

Then at step S2, the second transverse direction side differential amplifier 6H receives the digital data supplied thereto from the transverse direction side analog to digital converter 4H and a preset load value (for example, 200 g) supplied thereto from the central control unit 9, and judges whether or not the digital data is higher than the preset load value. Then, if the second transverse direction side differential amplifier 6H judges that the digital data is higher than the preset load value (Y), then it produces a comparison output (for example, the logic value 1), whereafter the control sequence advances to step S3. On the contrary if the second transverse direction side differential amplifier 6H judges that the digital data is equal to or lower than the preset load value (N), then it outputs a NOT output (for example, the logic value 0), whereafter the control sequence advances to another step S4.

At step S3, the transverse direction side timer circuit section 7H performs, when a comparison output is received from the second transverse direction side differential amplifier 6H, counting up of the counter during a period of time while the comparison output is received.

On the other hand, at step S4, the transverse direction side timer circuit section 7H performs, when a NOT output is received from the second transverse direction side differential amplifier 6H, counting down of the counter from a definite value. It is to be noted that, if the count value of the counter is zero, even if a NOT output is received, the counter does not perform its counting down operation.

Subsequently at step S5, the transverse direction side timer circuit section 7H judges whether or not the count value of the counter is zero. Then, if the transverse direction side timer circuit section 7H judges that the count value is not equal to zero (N), then it produces a non-zero detection output, whereafter the control sequence advances to step S6. However, when the transverse direction side timer circuit section 7H judges that the count value is equal to zero (Y), then it produces a zero detection output, whereafter the control sequence advances to another step S7.

At step S6, the transverse direction side timer circuit section 7H judges whether or not the time within which the non-zero detection output is received exceeds a predetermined time, for example, a time within which it can be judged that the stick type operation member 1 is continuously operated by a load force higher than the preset load value. Then, when the transverse direction side timer circuit section 7H judges that the time within which the non-zero detection output is supplied thereto does not reach the predetermined time (N), it produces a non-time up output, whereafter the control sequence advances to step S7, but when the transverse direction side timer circuit section 7H judges that the time within which the non-zero detection output is supplied thereto exceeds the predetermined time (Y), it produces a time up output, whereafter the control sequence advances to step S8.

At step S7, the transverse direction side output presence/absence judgment level production section 8H produces the low level A as a judgment level for presence/absence of an output in response to a zero detection output or a non-time up output supplied thereto from the transverse direction side timer circuit section 7H, and supplies the low level A to the central control unit 9.

Meanwhile, at step S8, the transverse direction side output presence/absence judgment level production section 8H produces the high level B as a judgment level for presence/absence of an output in response to a time up output supplied thereto from the transverse direction side timer circuit section 7H, and supplies the high level B to the central control unit 9.

Then at step S9, the central control unit 9 judges whether or not the digital data supplied thereto from the transverse direction side analog to digital converter 4H is higher than the low level A or the high level B supplied thereto from the transverse direction side output presence/absence judgment level production section 8H. Then, when the central control unit 9 judges that the digital data is higher than the low level A or the high level B (Y), the control sequence advances to step S10, but when the central control unit 9 judges that the digital data is equal to or lower than the low level A or the high level B (N), the control sequence returns to the first step S1.

Finally at step S10, the central control unit 9 produces information of presence of an output, for example, an output of the logic value 1, thereby completing the sequence of operations of the principal components when the stick type operation member 1 is operated.

It is to be noted that, after the sequence of operations is completed, the control sequence returns to the first step so that the same operations are repeated.

In this manner, with the keyboard apparatus according to the first embodiment, since the output presence/absence judgment level is automatically raised when the load force upon operation of the stick type operation member 1 is so high that a residual detection output may be produced, production of information of presence of an output originating from a residual detection output can be prevented. Consequently, even if a residual detection output is present, accurate operation output information of the stick type operation section can be obtained.

Figure 4:
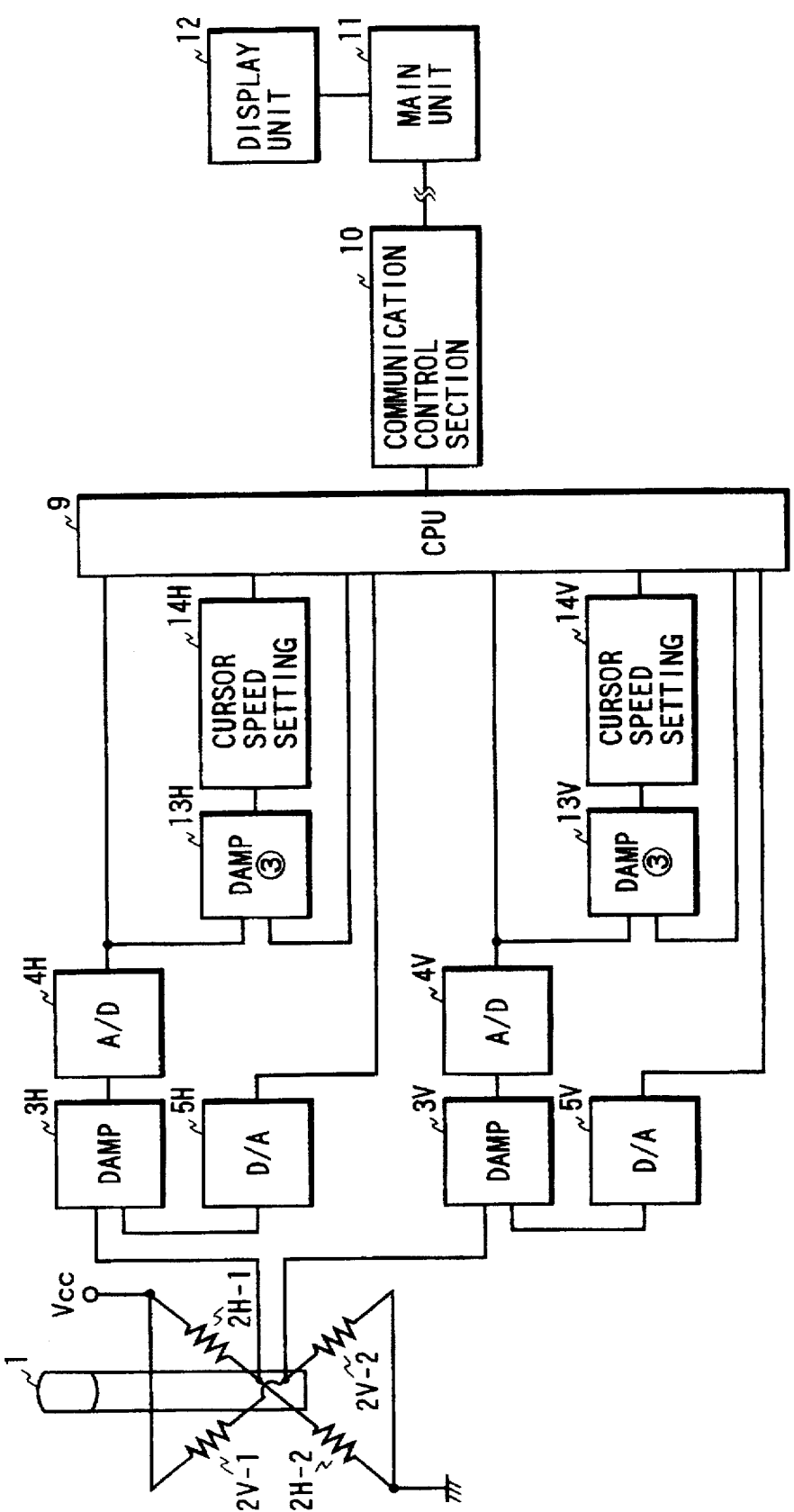
FIG. 4 is a block diagram of another operation inputting apparatus showing a second embodiment of the present invention.

Referring now to FIG. 4, there is shown an operation inputting apparatus according to a second embodiment of the present invention. Also the operation inputting apparatus of the present embodiment is constructed as a keyboard apparatus which includes a stick type operation member.

The operation inputting apparatus of the present embodiment is a modification to and includes common components to those of the operation inputting apparatus of the first embodiment described hereinabove with reference to FIG. 1 except the construction thereof described below. It is to be noted that, in FIG. 4, like components to those of FIG. 1 are denoted by like reference characters and overlapping description of them is omitted herein to avoid redundancy. The keyboard apparatus of the present embodiment includes a third transverse direction side differential amplifier (DAMP ③) 13H which is coupled at one of a pair of inputs thereof to the output of the transverse direction side analog to digital converter 4H and at the other input thereof to the central control unit 9. Also a third depthwise direction side differential amplifier (DAMP ③) 13V is coupled at one of a pair of inputs thereof to the output of the depthwise direction side analog to digital converter 4V and at the other input thereof to the central control unit 9. Further, a transverse direction side cursor movement speed setting section (cursor movement speed setting means) 14H is coupled at an input thereof to an output of the third transverse direction side differential amplifier 13H and at an output thereof to the central control unit 9. Also a depthwise direction side cursor movement speed setting section (cursor movement speed setting means) 14V is coupled at an input thereof to an output of the third depthwise direction side differential amplifier 13V and at an output thereof to the central control unit 9.

Thus, the operation inputting apparatus of the present embodiment is different in construction from the operation inputting apparatus of the first embodiment only in that the third transverse direction side differential amplifier 13H and the third depthwise direction side differential amplifier 13V are provided in place of the second transverse direction side differential amplifier 6H and the second depthwise direction differential amplifier 6V of the operation inputting apparatus of the first embodiment and that the transverse direction side cursor movement speed setting section 14H and the depthwise direction side cursor movement speed setting section 14V are provided in place of the transverse direction side timer circuit section 7H, the transverse direction side output presence/absence judgment level production section 8H and the depthwise direction side timer circuit section 7V, the depthwise direction side output presence/absence judgment level production section 8V, respectively.

Figure 5:
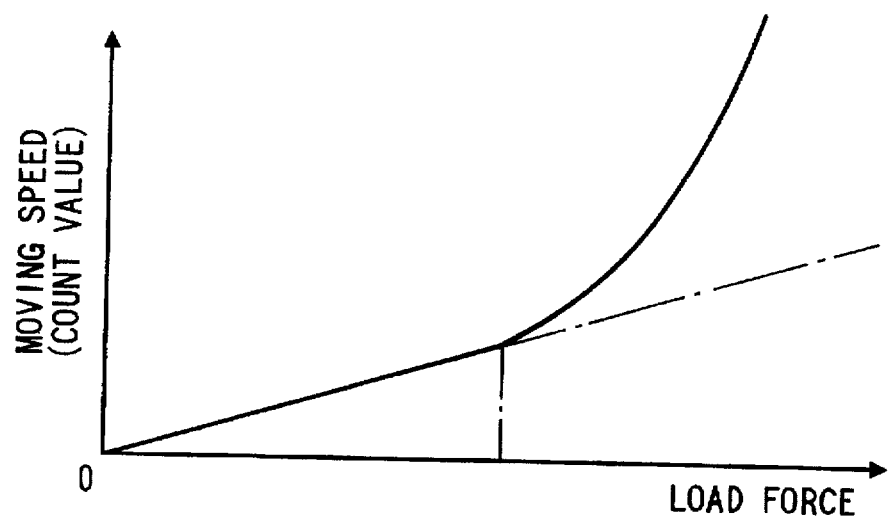
FIG. 5 is a characteristic diagram illustrating the relationship of a load force and the speed of movement of a cursor when a stick type operation member of the operation inputting apparatus of FIG. 4 is operated.

FIG. 5 illustrates a relationship between the load force and the speed of movement of the cursor when the stick type operation member 1 of the operation inputting apparatus of FIG. 4 is operated, and in FIG. 5, the axis of ordinate indicates the speed of movement of the cursor and the axis of abscissa indicates the load force.

Subsequently, operation of the keyboard apparatus of FIG. 4 will be described with reference to FIGS. 4 and 5. It is to be noted that, since operations performed by the components 2H-1, 2H-2, 3H to 5H, 13H and 14H for the transverse direction side also in the operation inputting apparatus of FIG. 4 are substantially same as operations performed by the components 2V-1, 2V-2, 3V to 5V, 13V and 14V for the depthwise direction side, only the operations performed by the components 2H-1, 2H-2, 3H to 5H, 13H and 14H for the transverse direction side will be descried below while description of the operations performed by the components 2V-1, 2V-2, 3V to 5V, 13V and 14V for the depthwise direction side is omitted herein.

Further, since operations of the keyboard apparatus of the second embodiment until digital data is obtained at the output of the transverse direction side analog to digital converter 4H when the stick type operation member 1 is operated are quite same as the operations until digital data is obtained at the output of the transverse direction side analog to digital converter 4H when the stick type operation member 1 of the keyboard apparatus of the first embodiment is operated, description of the operations until digital data is obtained is omitted herein, and in the following, only operations of the keyboard apparatus of the second embodiment after digital data is obtained will be described.

First, after digital data is obtained at the output of the transverse direction side analog to digital converter 4H, it is supplied to the central control unit 9 and the third transverse direction side differential amplifier 13H. The third transverse direction side differential amplifier 13H compares the digital data with a predetermined preset load value (second preset load value) supplied thereto from the central control unit 9. In this instance, the second preset load value is selected so as to correspond to a value of digital data with which the load force to be applied to the transverse direction side strain gauges 2H-1 and 2H-2 upon operation of the stick type operation member 1 may be a certain value, for example, 200 g. If the third transverse direction side differential amplifier 13H judges as a result of the comparison that the digital data is higher than the second preset load value, then it produces a comparison output. However, if the third transverse direction side differential amplifier 13H judges that the digital data is equal to or lower than the second preset load value, then it produces a NOT output. The comparison output or the NOT output is supplied to the transverse direction side cursor movement speed setting section 14H.

Here, the transverse direction side cursor movement speed setting section 14H includes a counter, which performs a counting operation in response to the magnitude of the inputted load force and performs to digital data supplied to be supplied to the central control unit 9, processing corresponding to the count value to set the speed of movement of the cursor displayed on the display unit 12. In particular, the transverse direction side cursor movement speed setting section 14H performs linear speed setting wherein the speed of movement of the cursor displayed on the display unit 12 (output count value) increases linearly as the inputted load force increases or non-linear speed setting wherein the speed of movement of the cursor displayed on the display unit 12 increases non-linearly, for example, along a curve of the second order, as the inputted load force increases. If linear speed setting is performed, then when the load force upon operation of the stick type operation member 1 increases, the speed of movement of the cursor varies in such a characteristic as indicated by a linear line of FIG. 5 wherein it increases linearly as the load force increases. In contrast, if non-linear speed setting is performed, then when the load force upon operation of the stick type operation member 1 increases, the speed of movement of the cursor varies in such a characteristic as indicated by a curved line portion of FIG. 5 wherein it increases non-linearly (along a curve of the second order) as the load force increases. Then, when a comparison output or a NOT output is supplied from the third transverse direction side differential amplifier 13H to the transverse direction side cursor movement speed setting section 14H, the transverse direction side cursor movement speed setting section 14H performs linear speed setting for the digital data to be supplied to the central control unit 9 within the period within which the NOT output is supplied thereto. In contrast, if a comparison output is supplied to the transverse direction side cursor movement speed setting section 14H, the transverse direction side cursor movement speed setting section 14H performs non-linear speed setting for digital data to be supplied to the central control unit 9.

The central control unit 9 converts digital data set by linear speed setting or non-linear speed setting into an output signal of a form preferable as output information of the keyboard apparatus and supplies the output signal to the communication control section 10 at the next stage. The communication control section 10 transmits the output signal from the keyboard apparatus to the main unit 11 such as a personal computer externally connected to the communication control section 10. When the output signal is received, the main unit 11 supplies it to the display unit 12 so that the cursor displayed on the display unit 12 is moved suitably at the set speed described above in accordance with the contents of the received signal.

Figure 6:
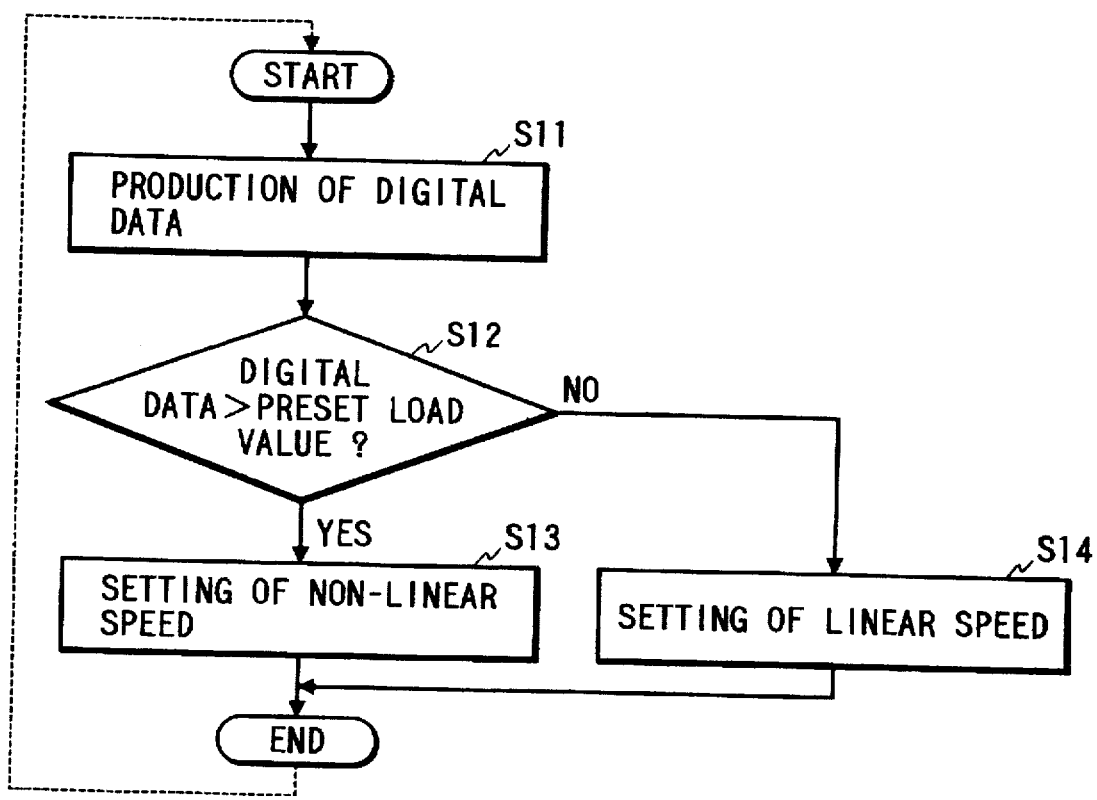
Figure 7A:
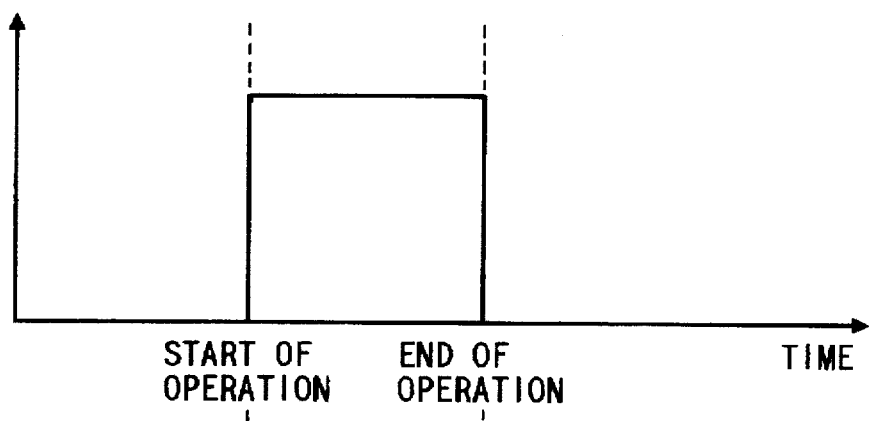
FIGS. 7(a) and 7(b) are diagrammatic views illustrating an operation condition of the stick type operation member of the operation inputting apparatus of FIG. 4 and a detection output extracted from a connection point between two strain gauges of the operation inputting apparatus.
Figure 7B:
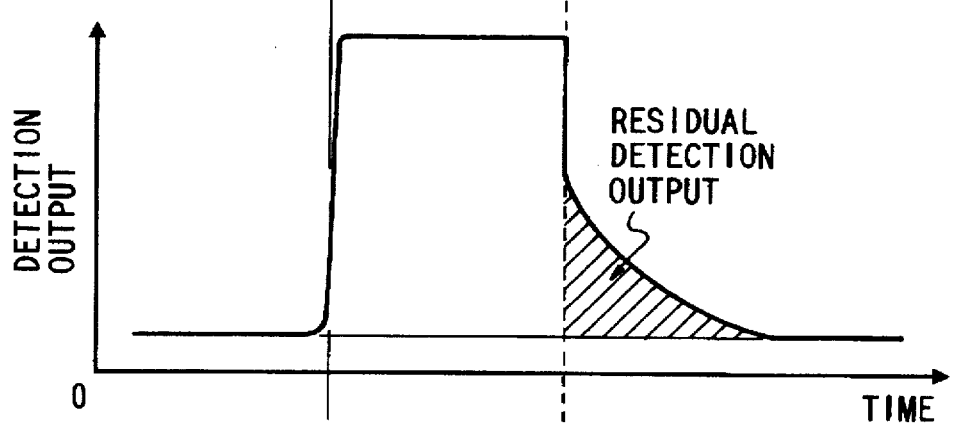

FIG. 6 illustrates operations of the principal components of the keyboard apparatus of the second embodiment when the stick type operation member 1 is operated.

While operation of the keyboard apparatus of FIG. 4 is described below with reference to FIG. 6, since operations performed by the components 2H-1, 2H-2, 3H to 5H, 13H and 14H for the transverse direction side are substantially same as operations performed by the components 2V-1, 2V-2, 3V to 5V, 13V and 14V for the depthwise direction side, only the operations performed by the components 2H-1, 2H-2, 3H to 5H, 13H and 14H for the transverse direction side will be descried below, but description of the operations performed by the components 2V-1, 2V-2, 3V to 5V, 13V and 14V for the depthwise direction side is omitted herein.

First at step S11, the transverse direction side analog to digital converter 4H produces digital data in response to an operation of the stick type operation member 1 and supplies the digital data to the third transverse direction side differential amplifier 13H and the central control unit 9.

Then at step S12, the third transverse direction side differential amplifier 13H receives the digital data supplied thereto from the transverse direction side analog to digital converter 4H and a second preset load value (for example, 200 g) supplied thereto from the central control unit 9, and judges whether or not the digital data is higher than the second preset load value. Then, if the third transverse direction side differential amplifier 13H judges that the digital data is higher than the second present load value (Y), then it produces a comparison output (for example, a logic value 1), whereafter the control sequence returns to step S13. But on the contrary if the third transverse direction side differential amplifier 13H judges that the digital data is equal to or lower than the second preset load value (N), then it produces a NOT output (for example, the logic value 0), whereafter the control sequence advances to another step S14.

At step S13, the transverse direction side cursor movement speed setting section 14H varies, in response a comparison output inputted thereto, the count value of the counter so that it increases in proportion to the inputted load value to the second power to perform non-linear speed setting for the digital data be supplied to the central control unit 9, thereby completing the sequence of operations.

In the meantime, at step S14, the transverse direction side cursor movement speed setting section 14H varies, in response to a NOT output inputted thereto, the count value of the counter so that it increases linearly in proportion to the inputted load value to perform linear speed setting for the digital data to be supplied to the central control unit 9, thereby completing the sequence of operations.

In this manner, with the keyboard apparatus of the second embodiment, since the speed of movement of the cursor increases, when the load force upon operation of the stick type operation member 1 is higher than a certain level, rapidly and non-linearly in response to the magnitude of the load force, not only when the key operator selects a large amount of movement of the cursor, but also when the key operator successively selects a large amount of movement of the cursor, the speed of movement of the cursor is considerably higher than the prior speed of movement of the cursor. Consequently, the irritated feeling of the key operator can be moderated and a very good operation feeling can be obtained.

Figure 8:
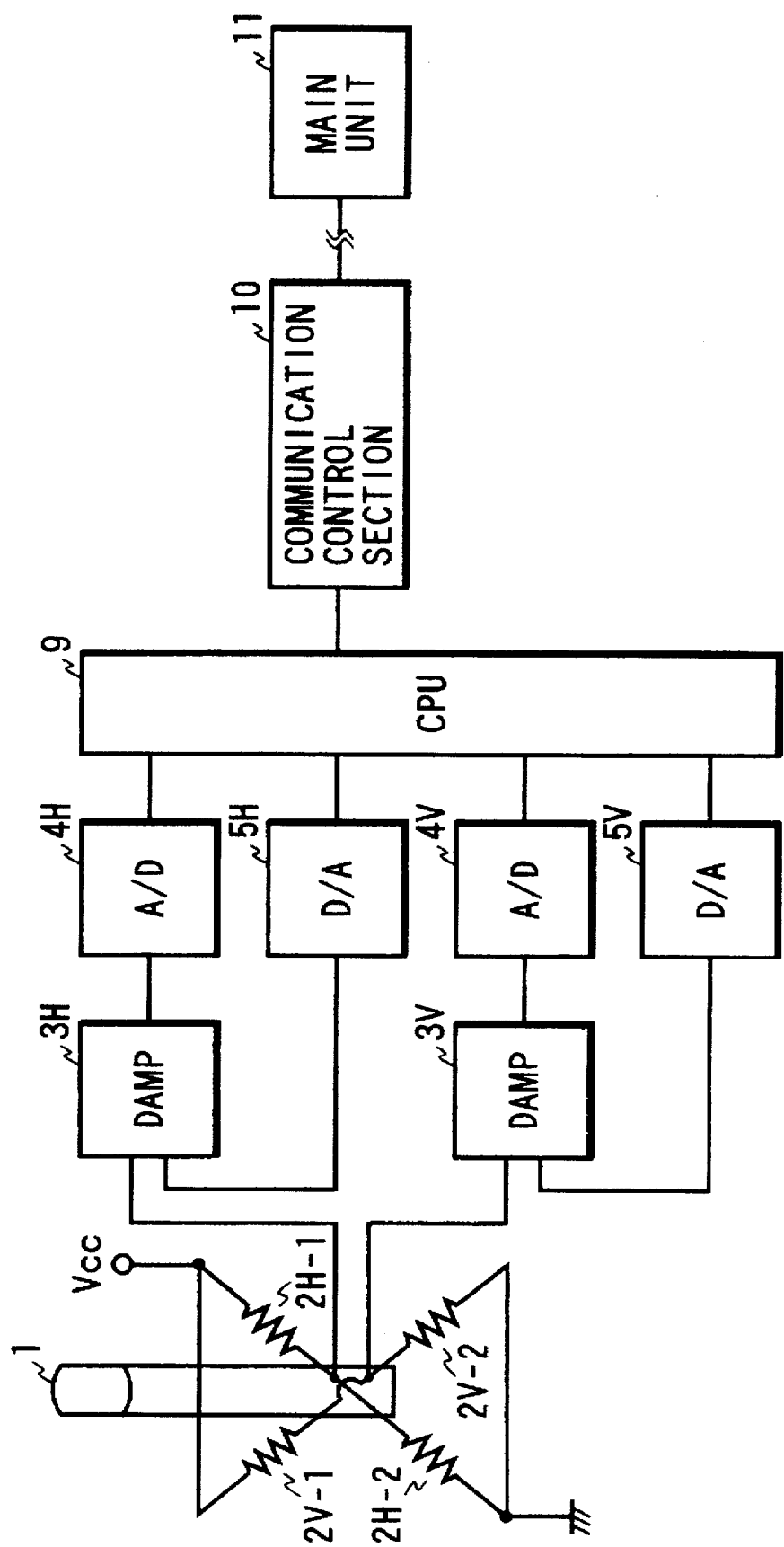
FIG. 8 is a flow chart illustrating operations of principal components of the operation inputting apparatus of FIG. 1 when the stick type operation member is operated.

FIG. 8 shows an operation inputting apparatus according to a third embodiment of the present invention. Also the operation inputting apparatus of the embodiment is constructed as a keyboard apparatus which includes a stick type coordinate inputting apparatus.

Referring to FIG. 8, the stick type operation member 1 has a pair of transverse direction side strain gauges (pressure detection sensors) 2H-1 and 2H-2 adhered to the opposite sides of a root portion thereof in a lateral or transverse direction (X-axis direction), and another pair of depthwise direction side strain gauges (pressure detection sensors) 2V-1 and 2V-2 adhered to the opposite sides of the root portion thereof in a perpendicular depthwise direction (Y-axis direction). The paired transverse direction side strain gauges 2H-1 and 2H-2 are connected in series between a power source terminal Vcc and a grounding point, and also the paired depthwise direction side strain gauges 2V-1 and 2V-2 are connected in series between the power source terminal Vcc and another grounding point. If an end of the stick type operation member 1 is pushed to move by a fingertip of a key operator, then the resistance values of the transverse direction side strain gauges 2H-1 and 2H-2 are varied relative to each other in response to a magnitude and a polarity of a transverse direction component of the pushing force, and similarly, also the resistance values of the depthwise direction side strain gauges 2V-1 and 2V-2 are varied relative to each other in response to a magnitude and a polarity of a depthwise direction component of the pushing force. A transverse direction side differential amplifier (detection outputting means) (DAMP) 3H is coupled at one of a pair of inputs thereof to a connection point between the paired transverse direction side strain gauges 2H-1 and 2H-2 and at the other input thereof to an output of a transverse direction side digital to analog converter (D/A) 5H. Also a depthwise direction side differential amplifier (detection outputting means) (DAMP) 3V is coupled at an input thereof to a connection point between the paired depthwise direction side strain gauges 2V-1 and 2V-2 and at the other input thereof to an output of a depthwise direction side digital to analog converter (D/A) 5V. A transverse direction side analog to digital converter (A/D) 4H is coupled at an input thereof to an output of the transverse direction side differential amplifier 3H and at an output thereof to a central control unit 9 (comparison control means). Also a depthwise direction side analog to digital converter (A/D) 4V is coupled at an input thereof to an output of the depthwise direction side differential amplifier 3V and at an output thereof to the central control unit 9. The transverse direction side digital to analog converter 5H is coupled at an input thereof to the central control unit 9 and at an output thereof to the other input of the transverse direction side differential amplifier 3H. Also the depthwise direction side digital to analog converter 5V is coupled at an input thereof to the central control unit 9 and at an output thereof to the other input of the depthwise direction side differential amplifier 3V. The communication control section 10 is coupled at an input thereof to the central control unit 9 and at an output thereof to a main unit 11 which may be a personal computer or the like.

Figure 9:
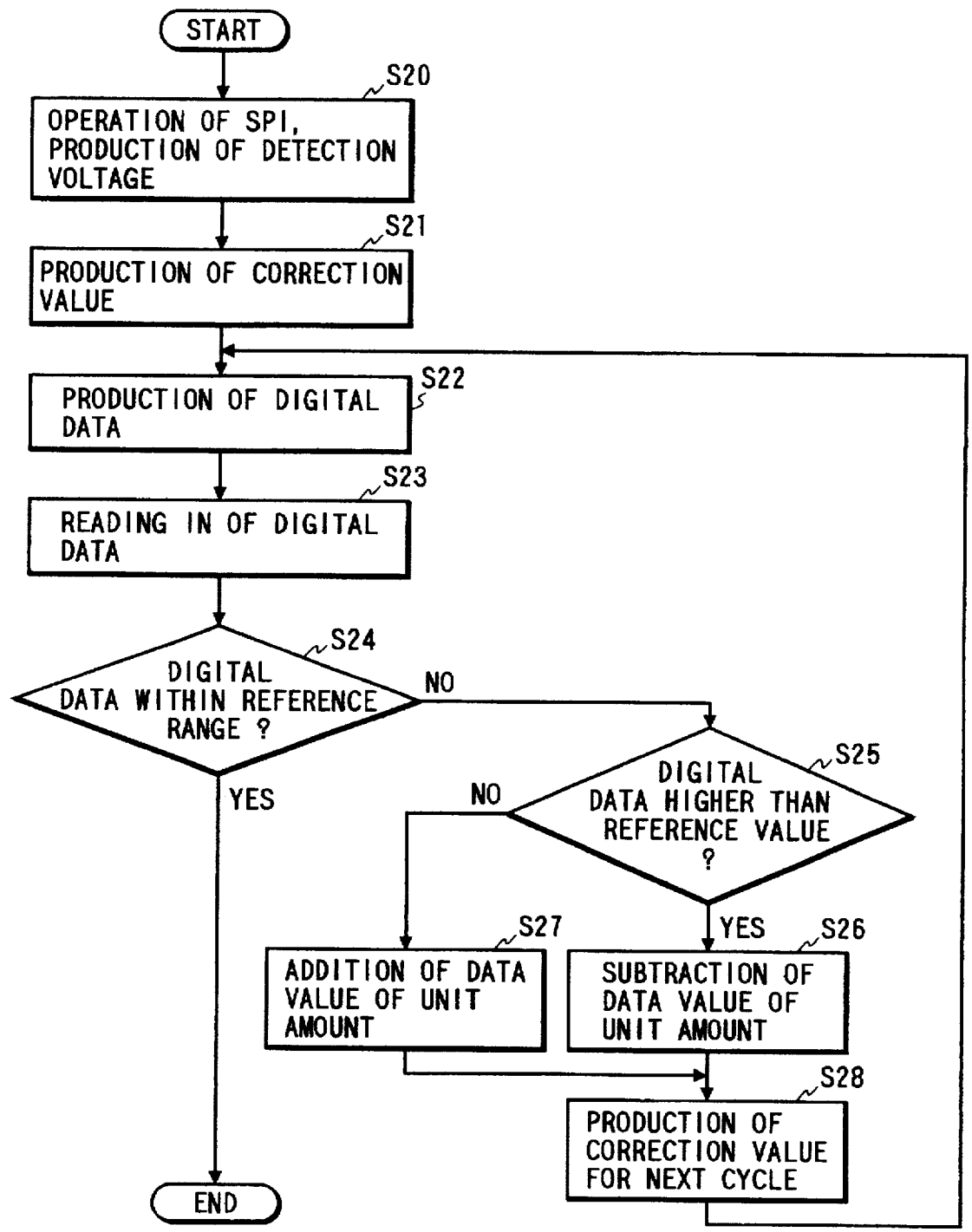
FIG. 9 is a flow chart illustrating a process of compensation operation for an offset caused by a dispersion in resistance value between a pair of strain gauges of the operation inputting apparatus of FIG. 8.

FIG. 9 illustrates a procedure of operation for compensating for an offset arising from a dispersion in resistance value among the paired strain gauges 2H-1, 2H-2 and 2V-1, 2V-2 of the keyboard apparatus of the embodiment shown in FIG. 8.

The offset compensation operation of the keyboard apparatus shown in FIG. 8 will be described with reference to the flow chart of FIG. 9. It is to be noted, however, that, since operations performed by the components 2H-1, 2H-2, 3H, 4H and 5H for the transverse direction side in the compensation operation are substantially same as operations performed by the components 2V-1, 2V-2, 3V, 4V and 5V for the depthwise direction side, only the operations performed by the components 2H-1, 2H-2, 3H, 4H and 5H for the transverse direction side will be descried below, but description of the operations performed by the components 2V-1, 2V-2, 3V, 4V and 5V for the depthwise direction side is omitted herein.

First at step S20, if the stick type operation member 1 is pushed to moved by a key operator, then the resistance values of the paired transverse direction side strain gauges 2H-1 and 2H-2 are varied relative to each other by a component of the movement of the stick type operation member 1 in a transverse direction. Consequently, a dc voltage corresponding to the relative variations of the resistance values is obtained at the connection point between the paired transverse direction side strain gauges 2H-1 and 2H-2, and the dc voltage is supplied to one of the inputs of the transverse direction side differential amplifier 3H.

Then at step S21, the transverse direction side digital to analog converter (D/A) 5H outputs a predetermined initial correction value and supplies it to the other input of the transverse direction side differential amplifier 3H.

Subsequently at step S22, the transverse direction side differential amplifier (DAMP) 3H differentially amplifies the dc voltage and the initial correction value inputted thereto to produce an initial detection analog output representative of the difference between them. Then, the transverse direction side analog to digital converter (A/D) 4H digitizes the initial detection analog output to produce initial digital data.

Then at step S28, the central control unit (CPU) 9 reads in the initial digital data.

Then at step S24, the central control unit 9 judges whether or not the initial data thus read in remains within a predetermined reference range. Then, if it judges that the initial digital data remains within the reference range (Y), then the sequence of operations is completed thereby, but if it otherwise judges that the initial digital data does not remain within the reference range (N), then the control sequence advances to step S25.

At step S25, the central control unit 9 judges whether or not the initial digital data read in is higher than a predetermined reference value. Then, if it judges that the initial digital data is higher than the reference value (Y), the control sequence advances to step S26, but on the contrary if it judges that the initial digital data is not higher than the reference value (N), then the control sequence advances to another step S27.

At step S26, the central control unit 9 subtracts a data value of a unit amount from the initial digital data to produce a new digital data.

On the other hand, at step S27, the central control unit 9 adds the data value of the unit amount to the initial digital data to similarly produce a new digital data.

Then at step S28, the transverse direction side digital to analog converter (D/A) 5H converts the new digital data supplied thereto from the central control unit 9 into an analog correction value for a next operation cycle and supplies the analog correction value for a next operation cycle to the input of the transverse direction side differential amplifier 3H connected thereto.

Thereafter, the control sequence returns to step S22, at which the transverse direction side differential amplifier (DAMP) 3H differentially amplifies the dc voltage and the analog correction value for a next operation cycle inputted thereto to produce a detection analog output for a next operation Cycle representative of the difference between them. Then, the transverse direction side analog to digital converter 4H digitizes the detection analog output for a next operation cycle from the transverse direction side differential amplifier 3H to produce digital data for a next operation cycle.

Thereafter, the operations beginning with step S23 are performed repetitively as described above. Then, when the digital data read into the central control unit 9 finally falls within the predetermined reference range described above, the offset compensation operation illustrated in the flow chart of FIG. 9 is completed. Thereafter, the analog correction value outputted from the transverse direction side digital to analog converter 5H upon such completion is continuously supplied to the input of the transverse direction side differential amplifier 3H connected to the transverse direction side digital to analog converter 5H.

In this manner, with the keyboard apparatus of the embodiment shown in FIG. 8, even if the resistance values of the paired transverse direction side strain gauges 2H-1 and 2H-2 and/or the paired depthwise direction side strain gauges 2V-1 and 2V-2 have a dispersion and consequently the two detection values from them have an offset between them, correction is performed in accordance with the magnitude of the offset, and consequently, the offset can be automatically compensated for.

Figure 10:
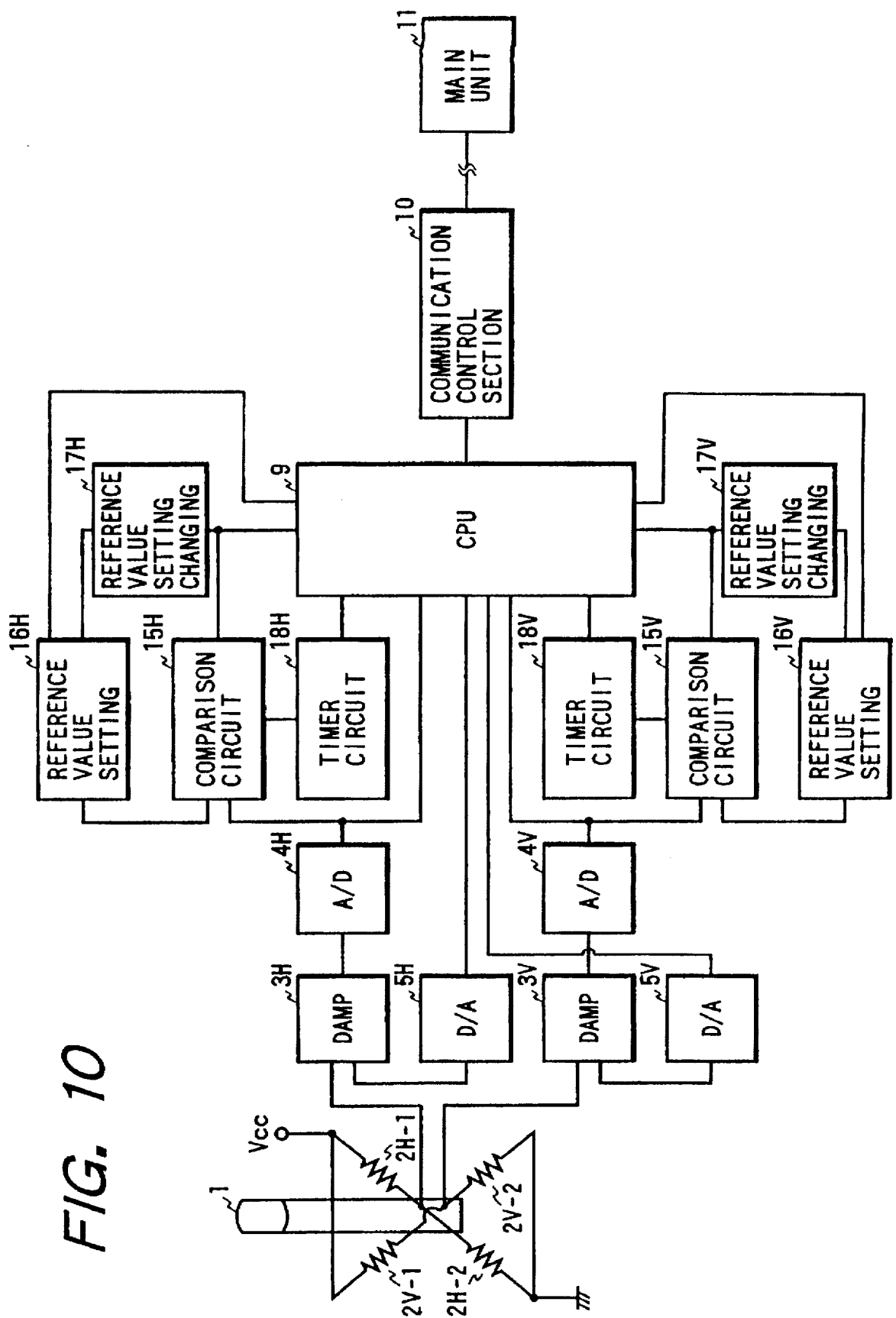
FIG. 10 is a block diagram of a still further operation inputting apparatus showing a fourth embodiment of the present invention.

Referring now to FIG. 10, there is shown an operation inputting apparatus according to a fourth embodiment of the present invention. Also the operation inputting apparatus of the fourth embodiment is constructed as a keyboard apparatus which includes a stick type operation member.

The operation inputting apparatus of the fourth embodiment is a modification to and includes common components to those of the operation inputting apparatus of the third embodiment described hereinabove with reference to FIG. 8 except the construction thereof described below. It is to be noted that like components to those of FIG. 8 are denoted by like reference characters in FIG. 10 and overlapping description of them is omitted herein to avoid redundancy. The operation inputting apparatus of the present embodiment includes a transverse direction side comparison circuit (output judgment means) 15H which is coupled at one of three inputs thereof to the output of the transverse direction side analog to digital converter (A/D) 4H and at the other input thereof to an output of a transverse direction side reference value setting circuit (reference value setting means) 16H and further at an output thereof to the central control unit (CPU) 9. Also a depthwise direction side comparison circuit (output judgment means) 15V is coupled at one of three inputs thereof to the output of the depthwise direction side analog to digital converter (A/D) 4V and at the other input thereof to an output of a depthwise direction side reference value setting circuit (reference value setting means) 16V and further at an output thereof to the central control unit 9. The transverse direction side reference value setting circuit 16H is coupled at inputs thereof to outputs of the central control unit 9 and a transverse direction side reference value setting changing circuit (reference value setting changing means) 17H, and also the depthwise direction side reference value setting circuit 16V is coupled at inputs thereof to outputs of the central control unit 9 and a depthwise direction side reference value setting changing circuit (reference value setting changing means) 17V. The transverse direction side reference value setting changing circuit 17H is coupled at an input thereof to an output of the transverse direction side comparison circuit 15H, and also the depthwise direction side reference value setting changing circuit 17V is coupled at an input thereof to an output of the depthwise direction side comparison circuit 15V. A transverse direction side timer circuit 18H is coupled to the central control unit 9 and the transverse direction side comparison circuit 15H, and also a depthwise direction side timer circuit 18V is coupled to the central control unit 9 and the depthwise direction side comparison circuit 15V.

Figure 11:
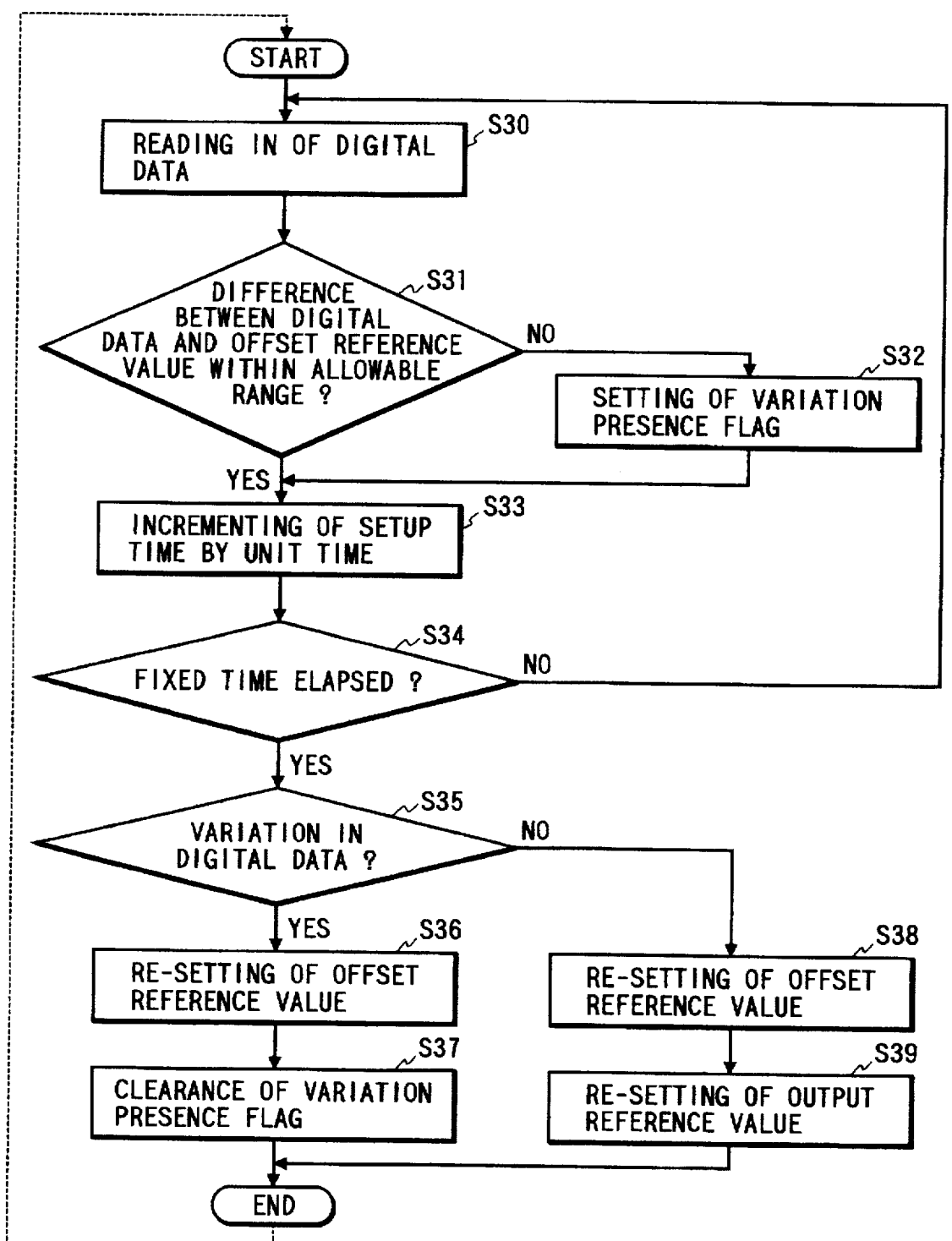

FIG. 11 illustrates a procedure of compensation operation of the keyboard apparatus of the fourth embodiment of FIG. 10 when digital data sent out from the transverse direction side analog to digital converter 4H and the depthwise direction side analog to digital converter 4V when the keyboard apparatus operates beyond an allowable offset range by a variation of the power source, a variation in ambient temperature, superposition of noise or the like.

Operation of the keyboard apparatus of FIG. 10 is described below with reference to FIG. 11. However, since operations performed by the components 2H-1, 2H-2, 3H to 5H, 15H to 18H for the transverse direction side in the compensation operation are substantially same as operations performed by the components 2V-1, 2V-2, 3V to 5V, 15V to 18V for the depthwise direction side, only the operations performed by the components 2H-1, 2H-2, 3H to 5H, 15H to 18H for the transverse direction side will be descried below, but description of the operations performed by the components 2V-1, 2V-2, 3V to 5V, 15V to 18V for the depthwise direction side is omitted herein. Further, it is assumed that, at an initial stage of the operation, an offset reference value, an output reference value and an allowable offset value have been set already in each of the transverse direction side reference value setting circuit 16H and the depthwise direction side reference value setting circuit 16V.

First at step S30, the the transverse direction side comparison circuit 15H reads digital data from the transverse direction side analog to digital converter (A/D) 4H and the offset reference value and the allowable offset range from the transverse direction side reference value setting circuit 16H under the control of the central control unit (CPU) 9.

Then at step S31, the transverse direction side comparison circuit 15H judges similarly under the control of the central control unit 9 whether or not the difference of the current digital data from the offset reference value remains within the allowable offset range. Then, when it judges that the difference remains within the allowable offset range (Y), the control sequence advances to step S33, but on the contrary when it judges that the difference does not remain within the allowable offset range (N), the control sequence advances to another step S32.

At step S32, the central control unit 9 determines that the digital data has varied and sets a variation present flag in the digital data.

Then at step S33, the central control unit 9 increases the setup value of the transverse direction side timer circuit 18H by a unit time.

Subsequently at step S34, the transverse direction side comparison circuit 15H judges under the control of the central control unit 9 whether or not the setup value of the transverse direction side timer circuit 18H is reached. Then, if it judges that the setup value is reached (Y), then the control sequence advances to step S35, but on the contrary if it judges that the setup value is not reached (N), then the control sequence returns to step S30 to repeat the operations beginning with the step S30.

At step S35, the central control unit 9 judges whether or not a variation in digital data has occurred by the operation of the stick type operation member 1. Then, if it judges that a variation has occurred (Y), then the control sequence advances to step S36, but if it judges that no variation has occurred (N), then the control sequence advances to Another step S38.

At step S36, the transverse direction side reference value setting changing circuit 17H changes the offset reference value of the transverse direction side reference value setting circuit 16H under the control of the central control unit 9 so as to re-set the offset reference value conforming to the value of the current digital data.

Then at step S37, the central control unit 9 determines that the variation in digital data has completed and resets the variation present flag in the digital data, thereby completing the sequence of operations.

On the other hand, at step S38, the transverse direction side reference value setting changing circuit 17H changes the offset reference value of the transverse direction side reference value setting circuit 16H under the control of the central control unit 9 so as to reset the offset reference value conforming to the variation condition of the current digital data.

Then at step S39, the transverse direction side reference value setting changing circuit 17H changes the output reference value of the transverse direction side reference value setting circuit 16H under the control of the central control unit 9 so as to re-set the output reference value conforming to the variation condition of the current digital data.

Figure 12:
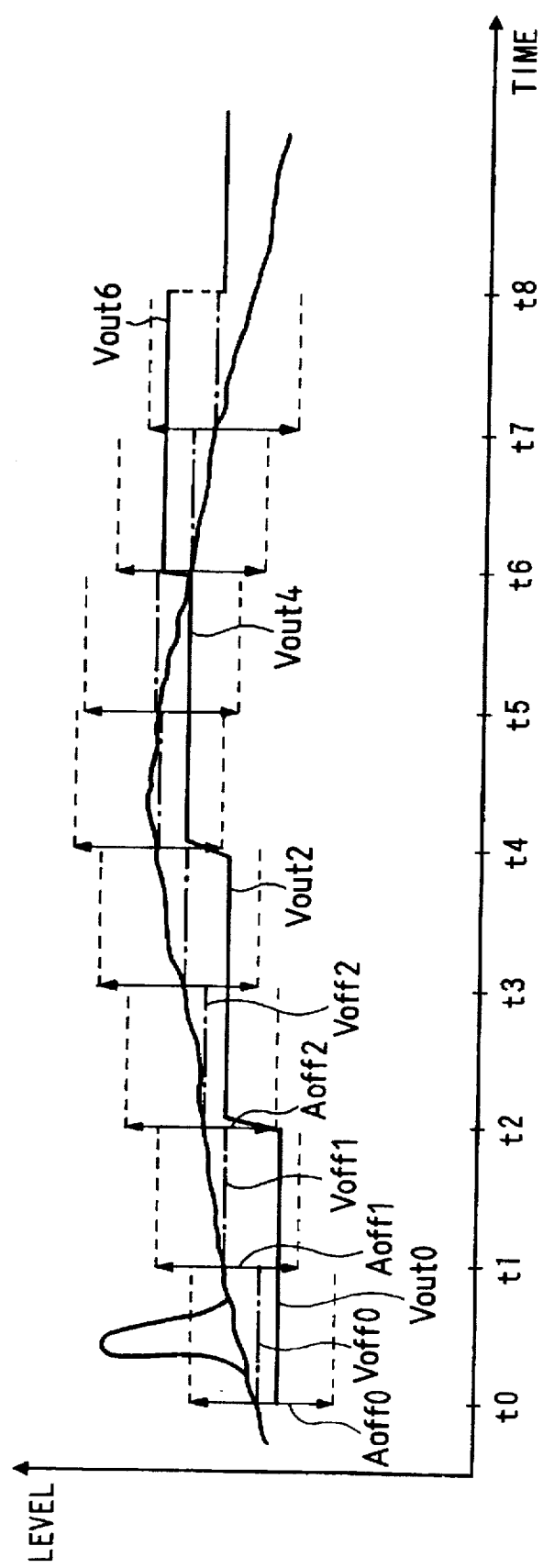
FIG. 12 is an operation diagram illustrating a manner wherein an offset reference value, an output reference value and the allowable offset range in the operation inputting apparatus of FIG. 10 successively vary when digital data successively vary.

FIG. 12 illustrates an example of a condition wherein an offset reference value, an output reference value and an allowable offset value in the keyboard apparatus of FIG. 10 successively vary when digital data successively varies as time passes.

Referring to FIG. 12, the axis of ordinate indicates the level of digital data, a reference value and so forth, and the axis of abscissa indicates time. Reference characters $t_0$, $t_1$, $t_2$, $t_3$ ... indicate points of time which successively come each time a unit time, for example, 1 second to 1.5 second, elapses.

As seen in FIG. 12, at time $t_0$, an offset reference value $V_{off0}$, an output reference value $V_{out0}$ and an allowable offset range $A_{off0}$ centered at the offset reference value $V_{off0}$ in the transverse direction side reference value setting circuit 16H are determined based on the current digital data.

Then, if it is assumed that, between time $t_0$ and time $t_1$, the digital data value exhibits such a sudden increasing variation that it exceeds the allowable offset range $A_{off0}$ (some input is received) but it immediately exhibits a decreasing variation until it falls within the allowable offset range $A_{off0}$ when time $t_1$ comes, then since the transverse direction side timer circuit 18H is set up by the unit time by the central control unit 9 at time $t_1$, the offset reference value $V_{off0}$ and the allowable offset range $A_{off0}$ until then are varied to another offset reference value $V_{off1}$ and another allowable offset range $A_{off1}$ based on digital data at the point of time $t_1$, respectively, while the output reference value $V_{out0}$ until then is maintained based on the judgment that the sudden variation of the digital data value (application of the input) merely arises from some disturbance.

Further, if the digital data value exhibits such a variation that it remains within the allowable offset range $A_{off1}$ at next time $t_2$, then the offset reference value $V_{off1}$ and the allowable offset range $A_{off1}$ until then are varied to another offset reference value $V_{off2}$ and another allowable offset range $A_{off2}$ based on the digital data value at the point of time $t_2$ similarly as described above. However, since the setup time of the transverse direction side timer circuit 18H comes at the point of time, the output reference value $V_{out0}$ until then is varied to a new output reference value $V_{out2}$ based on the digital data value at the point of time $t_1$.

Then, if the digital data value exhibits such a variation that it remains within the allowable offset range $A_{off2}$ also at time $t_3$, the transverse direction side timer circuit 18H is similarly set up by the unit time, and the offset reference value $V_{off2}$ and the allowable offset range $A_{off2}$ until then are varied to another offset reference value $V_{off3}$ and another allowable offset range $A_{off3}$ based on the digital data value at the point of time $t_3$. However, the output reference value $V_{out1}$ until then is maintained.

The operation after time $t_4$ is similar to the operation described above. In particular, if the digital data value exhibits such a variation that it falls within the last allowable offset range $A_{off4}$, then the offset reference value $V_{off3}$ and the allowable offset range $A_{off3}$ until then are varied to another offset reference value $V_{off4}$ and another allowable offset range $A_{off4}$ based on the digital data value at the point of time. On the other hand, the output reference value $V_{out1}$ until then is varied to a new output reference value $V_{out3}$ based on the digital data value at the last point of time $t_3$, and within the next unit time, the output reference value $V_{out3}$ until then is maintained.

It is to be noted that, in the operation described above, the updating of the output reference value may be performed not every other time but every two other times a unit time elapses.

In this manner, with the keyboard apparatus of the present embodiment described above with reference to FIGS. 10 to 12, even if the digital data value exhibits a sudden temporary variation due to superposition of noise or the like, since the offset reference value, the output reference value and the allowable offset value are varied so as to conform to a slow variation in digital data value caused by a variation in power source voltage or ambient temperature without being influenced by the sudden temporary variation of the digital data value, any variation of the digital data value arising from an operation of the stick type operation member 1 can be detected accurately at any time.

In summary, in the operation inputting apparatus of the first embodiment described hereinabove with reference to FIG. 1, when the stick type operation member 1 is operated, if a load force higher than the fixed value is successively applied, then the high level B is selected as the judgment level for presence/absence of an output. Consequently, detection of presence of an output is performed with the high level B so that a residual detection output when the load force is removed may not substantially be outputted. On the other hand, when the stick type operation member 1 is operated, if a load force equal to or lower than the fixed value is applied or if no load is applied (no operation is performed), then the low level A is selected as the judgment level for presence/absence of an output. Consequently, detection of presence of an output is performed with the low level A. Since the judgment level for presence/absence of an output is determined in response to a detection output corresponding to the load force, there is an advantage in that, even if a residual detection output remains after the operation of the stick type operation member 1, it is possible to obtain accurate operation output information of the stick type operation member 1.

Meanwhile, in the operation inputting apparatus of the second embodiment described hereinabove with reference to FIG. 4, if the load force applied upon operation of the stick type operation member 1 is increased, then since the speed of movement of the cursor is increased suddenly in response to the magnitude of the load force thus applied, not only when a key operator selects a large amount of movement of the cursor, but also when the key operator successively selects a large amount of movement of the cursor, the speed of movement of the cursor can be made considerably higher than the prior speed of movement of the cursor. Consequently, there is an advantage in that the irritated feeling of the key operator can be moderated and a very good operation feeling can be obtained.

Further, in the operation inputting apparatus of the third embodiment described hereinabove with reference to FIG. 8, the detection outputting means 3H or 3V first outputs an initial detection value based on an initial correction value and a detection output of the pressure detection sensor 2H-1, 2H-2, 2V-1 or 2V-2, and then the central control unit 9 judges whether or not the initial detection value outputted from the detection outputting means 3H or 3V is within the predetermined reference range. Then, only when it is judged that the reference range is exceeded, the central control unit 9 outputs a correction value for a next operation cycle of a polarity and a magnitude conforming to a direction and a magnitude of the excess, respectively. Then, when the correction value for a next operation cycle is outputted, the detection outputting means 3H or 3V operates based on the detection output from the pressure detection sensor 2H-1, 2H-2, 2V-2 or 2V-2 and the correction value for a next control cycle inputted thereto to output a detection value for a next operation cycle which is offset so as to fall within the reference range. Consequently, even if the initial resistance values of the pressure detection sensors in pair 2H-1, 2H-2 or 2V-1, 2V-2 have a dispersion and consequently the detection outputs from the pressure detection sensors 2H-1, 2H-2, or 2V-1, 2V-2 have an offset between them, the offset is automatically corrected. Consequently, fine variations in resistance value of the pressure detection sensors 2H-1, 2H-2, or 2V-1, 2V-2 corresponding to a condition of movement of the stick type operation member 1 are always read accurately. Accordingly, there is an advantage in that the amount of movement of the stick type operation member 1 can be detected accurately.

Furthermore, in the operation inputting apparatus of the fourth embodiment described hereinabove with reference to FIG. 10, the detection outputting means 3H or 3V produces a detection output value from the pressure detection sensor 2H-1, 2H-2, 2V-1 or 2V-2, and the reference value setting means 16H or 16V sets an offset reference value, an allowable offset range centered at the offset reference value and an output reference value. Further, the output judgment means 15H or 15V judges whether or not a difference between the detection output value of the pressure detection sensor 2H-1, 2H-2, 2V-1 or 2V-2 and the offset reference value remains within the allowable offset value. Then, when the output judgment means 15H or 15V judges after lapse of the predetermined time that the difference between the detection output value of the pressure detection sensor 2H-1, 2H-2, 2V-1 or 2V-2 and the offset reference value still remains within the allowable offset range, the reference value setting changing means 17H or 17V operates to change the offset reference value and the output reference value set by the reference value setting means 16H or 16V in response to the detection output value of the pressure detection sensor 2H-1, 2H-2, 2V-1 or 2V-2. Consequently, even if the detection output value of the pressure detection sensor 2H-1, 2H-2, 2V-1 or 2V-2 exhibits a variation with respect to time by an influence of a variation in power source voltage or ambient temperature or exhibits a temporary variation by an influence of external noise or the like, fine variations in resistance value of the pressure detection sensors 2H-1, 2H-2, 2V-1 or 2V-2 corresponding to a condition of movement of the stick type operation member 1 are always read accurately without being influence of the variation mentioned above. Accordingly, there is an advantage in that the amount of movement of the stick type operation member 1 can be detected accurately.

Having now fully described the invention, it will be apparent to one of ordinary skill in the art that many changes and modifications can be made thereto without departing from the spirit and scope of the invention as set forth herein.

What is claimed is:

1. An operation inputting apparatus for generating a cursor control signal used to control the position of a cursor on a display screen, the apparatus comprising:

an operation member;

a pressure detection sensor connected to the operation member for detecting a load force applied to said operation member, and for generating a detector signal having a voltage level which is related to the detected load force;

an analog to digital converter for converting the detector signal into digital data;

a comparison circuit for comparing the digital data with a preset load value, and for generating a comparison result having a first value when the digital data is greater than the preset load value, and a second value when the digital data is less than the preset load value;

a timer circuit for generating a timing value, the timing value being increased when the comparison result has the first value, and the timing value being decreased when the comparison result has the second value;

output judgment level setting means for generating a judgment signal, wherein the judgment signal is at a first level when the timing value is less than a predetermined time, and the judgement signal is at a second level when the timing value is greater than the predetermined time; and a processor for comparing the digital data with the judgement signal, for generating a cursor control signal having a first value when the digital data is greater than the judgement signal, and for generating a cursor control signal which has a second value when the digital data is less than the judgement signal.

2. An operation inputting apparatus according to claim 1, wherein said operation member is a stick-type coordinate inputting apparatus and said pressure detection sensor is one of:

(a) a strain gauge, (b) a resistance detecting device, (c) a capacitance detecting device, and (d) a pressure sensitive rubber member; and wherein the detector signal is based on one of a resistance value and a capacitance value.

3. An operation inputting apparatus for generating a cursor control signal used to control the position of a cursor on a display screen, the apparatus comprising:

a operation member;

a pressure detection sensor connected to the operation member for detecting a load force applied to said operation member, and for generating a detector signal having a voltage level which is related to the detected load force;

an analog to digital converter for converting the detector signal into digital data;

cursor movement speed setting means for receiving the digital signal and for generating a cursor speed control signal in accordance with a magnitude of the load force, wherein said cursor speed control signal varies linearly with respect to a variation of the load force while the digital data is less than a fixed value, and wherein the cursor speed control signal varies non-linearly with respect to a variation of the load force when the digital data is greater than the fixed value.

* * * * *